(12) United States Patent
Wech et al.

(10) Patent No.: US 6,758,092 B2
(45) Date of Patent: Jul. 6, 2004

(54) FLUID LEVEL VERIFICATION APPARATUS

(75) Inventors: Michael J. Wech, Manitowoc, WI (US); Joseph L. Teresi, Green Bay, WI (US)

(73) Assignee: Oil-Rite Corporation, Manitowoc, WI (US)

( * ) Notice: Subject to any disclaimer, the term of this patent is extended or adjusted under 35 U.S.C. 154(b) by 0 days.

(21) Appl. No.: 10/065,560

(22) Filed: Oct. 30, 2002

(65) Prior Publication Data

US 2004/0083809 A1 May 6, 2004

(51) Int. Cl.$^7$ ................................................ G01F 23/02
(52) U.S. Cl. ........................................ 73/325; 83/323
(58) Field of Search ...................... 73/325, 323, 290 R, 73/326

(56) References Cited

U.S. PATENT DOCUMENTS

| | | |
|---|---|---|
| 21,836 A | 10/1858 | Lapham et al. |
| 707,943 A | 8/1902 | Rockwell |
| 986,199 A | 3/1911 | Moser |
| 1,164,484 A | 12/1915 | Ernst |
| 1,406,929 A | 2/1922 | Butcher |
| 3,154,945 A | 11/1964 | Busillo ........................ 73/209 |
| 3,212,334 A | 10/1965 | Conlon ........................ 73/326 |
| 3,292,434 A | 12/1966 | McDaniel .................... 73/292 |
| 3,455,163 A | 7/1969 | Lukas et al. ................. 73/292 |
| 3,540,276 A * | 11/1970 | Lyden ......................... 73/328 |
| 3,596,939 A * | 8/1971 | Gibson .................... 285/382.2 |
| 3,835,708 A | 9/1974 | Gruett ......................... 73/292 |
| 3,886,796 A | 6/1975 | Gruett ......................... 73/328 |
| 4,050,305 A | 9/1977 | Evans et al. ................. 73/209 |
| 4,345,468 A | 8/1982 | Jackson ....................... 73/326 |
| 5,323,653 A | 6/1994 | Gruett ......................... 73/326 |
| 5,379,913 A * | 1/1995 | Rieke et al. ............... 220/601 |
| 6,532,815 B2 * | 3/2003 | Wech ......................... 73/328 |

FOREIGN PATENT DOCUMENTS

| | | |
|---|---|---|
| GB | 1133798 | 10/1968 |
| WO | WO 84/04163 | 10/1984 |

* cited by examiner

Primary Examiner—Hezron Williams
Assistant Examiner—Rodney Frank
(74) Attorney, Agent, or Firm—Ryan Kromholz & Manion, S.C.

(57) ABSTRACT

An improved fluid level verification apparatus for use on liquid filled containers and configured to reduce inherent mechanical stresses on the inspection tube and resist leakage due to environmental, chemical, thermal or mechanical expansion cycles by using a protective shield member to encase the inspection sight member, and, also, a method for permanently sealing the fluid level detection apparatus.

7 Claims, 8 Drawing Sheets

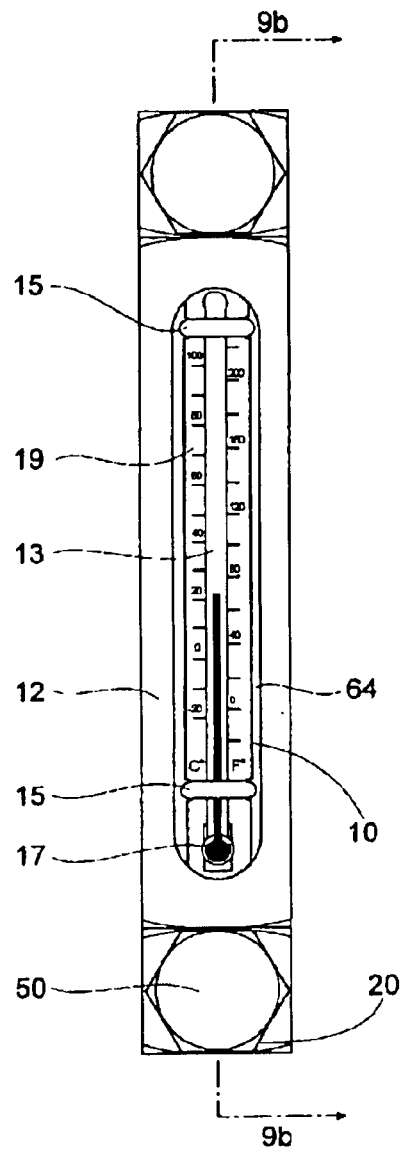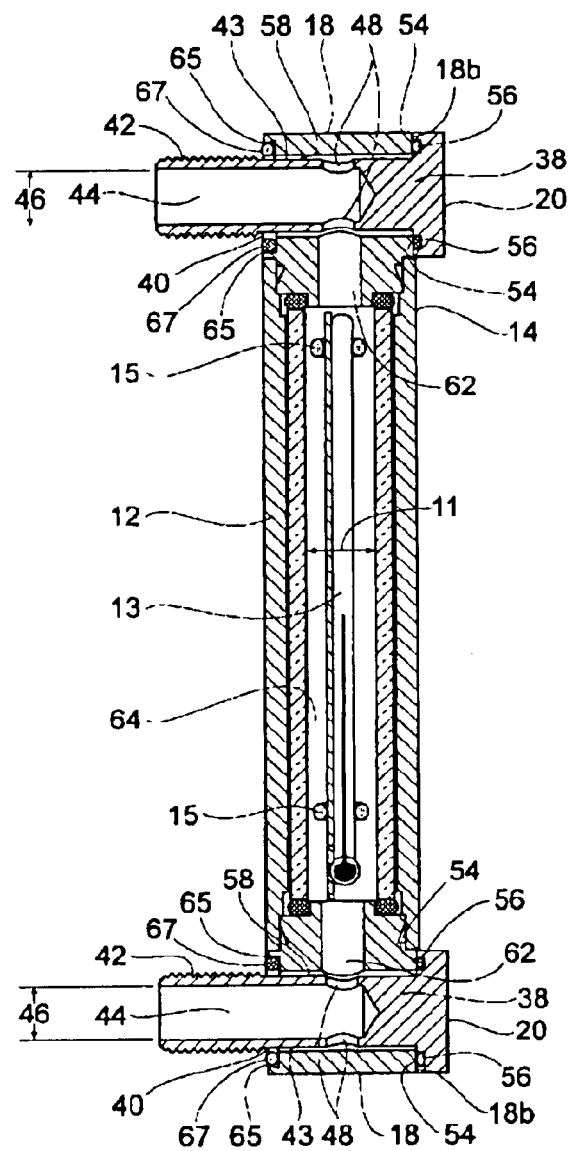
Fig. 9a
Fig. 9b

FLUID LEVEL VERIFICATION APPARATUS

BACKGROUND OF INVENTION

1. Field of the Invention

The present invention relates generally to a fluid level verification apparatus which is operable to measure the amount of fluid present in a fluid container, such as a tank, machine, or other article of manufacture, and more specifically, to an apparatus which may be manufactured or otherwise fabricated as a kit for use on particular machines or in manufacturing processes; and which minimizes the number of components required; and further to a fluid level verification apparatus which reduces mechanical, thermal and chemical stresses on the apparatus.

2. Description of the Prior Art

The prior art is sated with examples of fluid level verification apparatuses which provide a means for visually verifying or otherwise discovering the fluid levels in an object of interest, such as manufacturing machinery, fluid holding tanks, or other similar assemblies. For example, in certain industrial processes or in certain machines or other articles of manufacture, it is important that particular fluids, such as lubricants, coolants, hydraulic fluids, or other fluid components, be stored in tanks and periodically dispensed from such tanks. Prior art fluid verification devices have typically included a transparent tube or inspection window, which is connected in particular relation to the holding tank, and which provides a quick and convenient means by which an observer may visually verify the level of the fluid present.

While the prior art devices have operated with success, they have been unsatisfactory in several respects.

Gruett, U.S. Pat. No. 5,323,653, assigned to the same assignee as the present application, provides a detailed background of the prior art and describes a fluid level verification apparatus that can be fabricated as a kit and assembled at a remote location. Gruett contemplates an inspection tube having an interior conduit dimensioned to create an interference fit with an oaring used to hermetically seal the inspection tube to an end member. The Gruett apparatus requires a separate seal on the outer diameter of its glass inspection tube to complete a hermetic seal.

Jackson, U.S. Pat. No. 4,345,468, describes a double tube liquid sight monitor, which incorporates grooving and o-rings to isolate the inspection tube from the environment. However, the Jackson invention is relatively complex and cumbersome, as it requires numerous parts to protect the inspection tube from the stresses caused by the environment. Moreover, the sealing function of the grooves are limited to the insert ends thus requiring the o-rings to rest against the internal and external surfaces of inspection tubes that have no such grooves and the problem of mechanical stress induced by the assembly of the inspection tubes to mating components is not contemplated.

Evans, U.S. Pat. No. 4,050,305, describes an external shield bracket for a fluid flowmeter. The fluid of interest flows through a precision glass tube. An operator is protected from accidental explosion of the inspection tube due to fluid pressure by a protective transparent cover mounted on a U-shaped channel bracket. The Evans invention uses many parts, but fails to protect the inspection tube from the environment. Furthermore, this transparent cover and mounting bracket do not form a hermetic closure for the inspection tube contained therein.

Gruett, U.S. Pat. No. 3,886,796, also assigned to the same assignee as the present application, describes a liquid level gauge with a rigid transparent plastic inspection tube with o-rings seated in grooves located in the end members. The Gruett invention was designed for assembly without the need of o-ring grooves on the exterior or interior portions of the inspection tube. The ends of the inspection tube are restricted and nested in the end members.

Lyden, U.S. Pat. No. 3,540,276, describes a fluid level gauge. The Lyden Invention uses an o-ring seal nested in an end member, communicating with the adjacent end of a sight tube. Fluid leaks are minimized by placing the glass sight tube in compression with the o-ring seal nested in the respective end member. The glass sight tube is required because the Lyden invention requires compressive force on the tube. Thus, the design creates inherent mechanical stress, and without utilizing the glass sight tube, adapts poorly to thermal, environmental and chemical expansion cycles and therefore is susceptible to leakage.

Lukas, U.S. Pat. No. 3,455,163, describes a liquid level gauge where the apparatus is backwardly attached to the liquid tank. The Lukas Invention allows for the inspection sight member to be fittingly secured within the support body by means of plugs placed at the ends of the inspection sight member. However, the use of plugs to secure the inspection sight member within the apparatus causes compressive stress on the inspection sight member. Furthermore, the Lukas invention is not easily attached or removed from a liquid tank.

One advantage of most prior art fluid level detection apparatuses is the ease of replacing the inspection sight member without having to replace the rest of the apparatus. However, the trend in recent years is that users of the apparatus are replacing the entire apparatus, even if only the Inspection sight member needs to be replaced. Many of the prior art devices are cumbersome and otherwise complex in their overall design, thereby increasing the cost to manufacture, decreasing the reliability and making them difficult to maintain. Further, the prior art is replete with designs that inadequately address the often conflicting requirements of resisting fluid leaks and protecting the inspection tube from mechanical, environmental, thermal and chemical stresses. Therefore, a need exits for a fluid level verification apparatus that is simple to manufacture yet durable and reliable in use.

SUMMARY OF INVENTION

It is, therefore, an object of the present Invention to provide an improved fluid level verification apparatus.

Another object of the present invention is to provide a fluid level verification apparatus which can be fabricated and remain assembled through subsequent handling, transport, and shipping operations.

Specifically, it is an object of the present invention to provide a fluid level verification apparatus that requires no reassembly before use for a wide range of devices and other objects of interest.

Yet another object of the present invention is to protect the transparent inspection tube from mechanical stress during manufacture, transport, handling, shipping, assembly, and use for a wide range of devices and other objects of interest.

Another further object of the present invention is to provide a means to reduce or minimize stress on the apparatus, whether such stress is due to thermal, mechanical, environmental or chemical agents acting upon the apparatus.

Still another object of the present invention is to provide a means to reduce or minimize leaking of the fluid flowing through the apparatus.

Still another further object of the present invention is to provide added support to the inspection sight member without adding unnecessary stress to the inspection sight member.

Another further object of the present invention is to reduce or minimize stress to the sight member caused by interconnectivity of the end members, sight member, and the shield member of the apparatus.

Still another object of the present invention is to reduce or minimize leaking of the fluid flowing through the apparatus, and doing so with a minimum amount of stress resulting on the sight member.

Still another object of the present invention Is to reduce the number of components required for the resulting assembly thereby decreasing manufacturing costs.

Another further object of the present invention is to provide a method for permanently connecting the end blocks of the apparatus to the shield member of the apparatus without adding stress to the inspection sight member.

Still another object of the present Invention Is to provide an apparatus that may contain a thermometer for measuring the temperature of the fluid flowing through the apparatus" conduit.

BRIEF DESCRIPTION OF DRAWINGS

FIG. 9a is a front elevated view of another embodiment of this invention in which the sight member is arranged to receive a thermometer seated within the hollow bore of the sight tube.

FIG. 9b is a side longitudinal sectional view of the thermometer adaptation of this invention taken along line 9b 9b of FIG. 9a.

DETAILED DESCRIPTION

Although the disclosure hereof is detailed and exact to enable those skilled in the art to practice the invention, the physical embodiments herein disclosed merely exemplify the invention that may be embodied in other specific structures. While the preferred embodiment has been described, the details may be changed without departing from the invention, which is defined by the claims. Like parts, described herein, are designated by like reference numbers.

Figure 1:
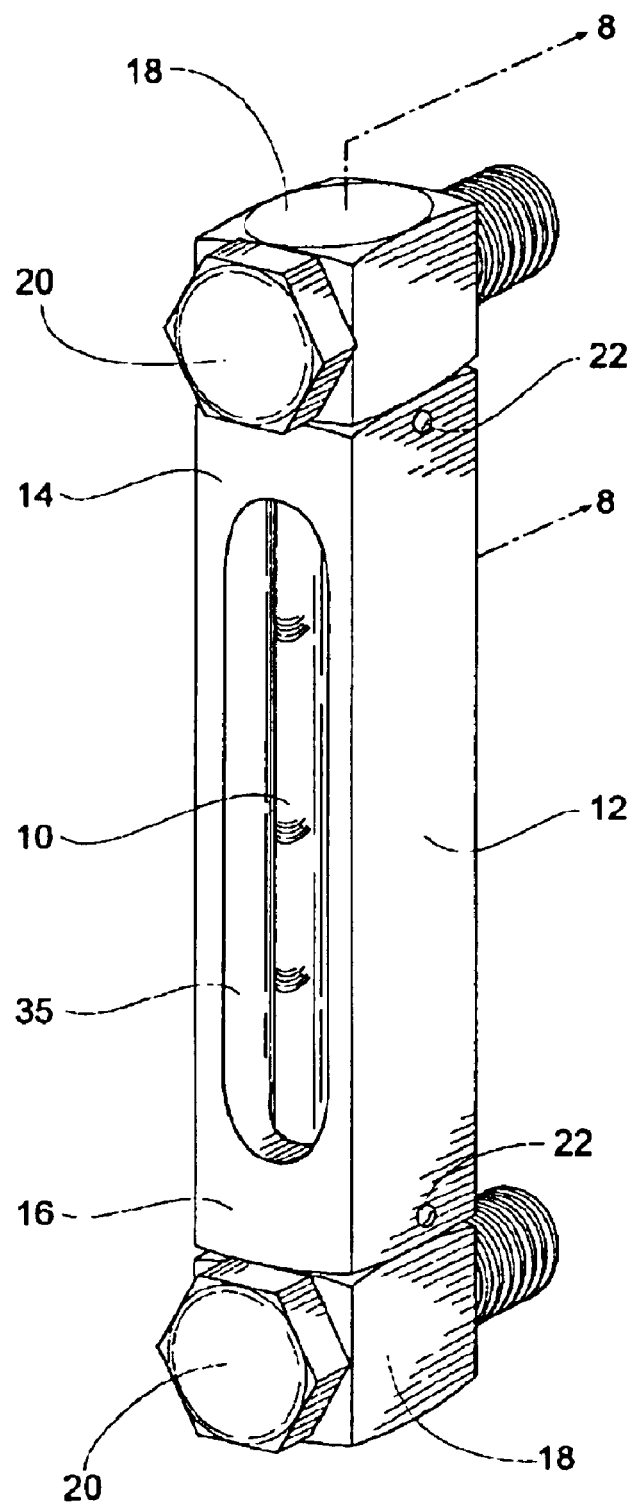
FIG. 1 is an isometric view of the present invention, as it would appear in the environment.

Referring to FIG. 1, there is illustrated an embodiment of an improved fluid level verification apparatus utilizing a transparent tubular inspection sight member 10. The sight member 10 is encased and supported by a shield member 12, said shield member 12 having a first end 14 and a second end 16. Also depicted is a pair of substantially Identical end members, or supporting blocks 18. Each block 18 has six sides and a mounting bolt 20. One of the blocks 18 is permanently secured to the shield member 12 at the first end 14, and the other block 18 is permanently secured to the second end 16. The means to permanently secure the end blocks 18 to the shield member 12 can be seen by noting the indentations 22 at each end of the shield member 12, which will later be described.

Figure 2:
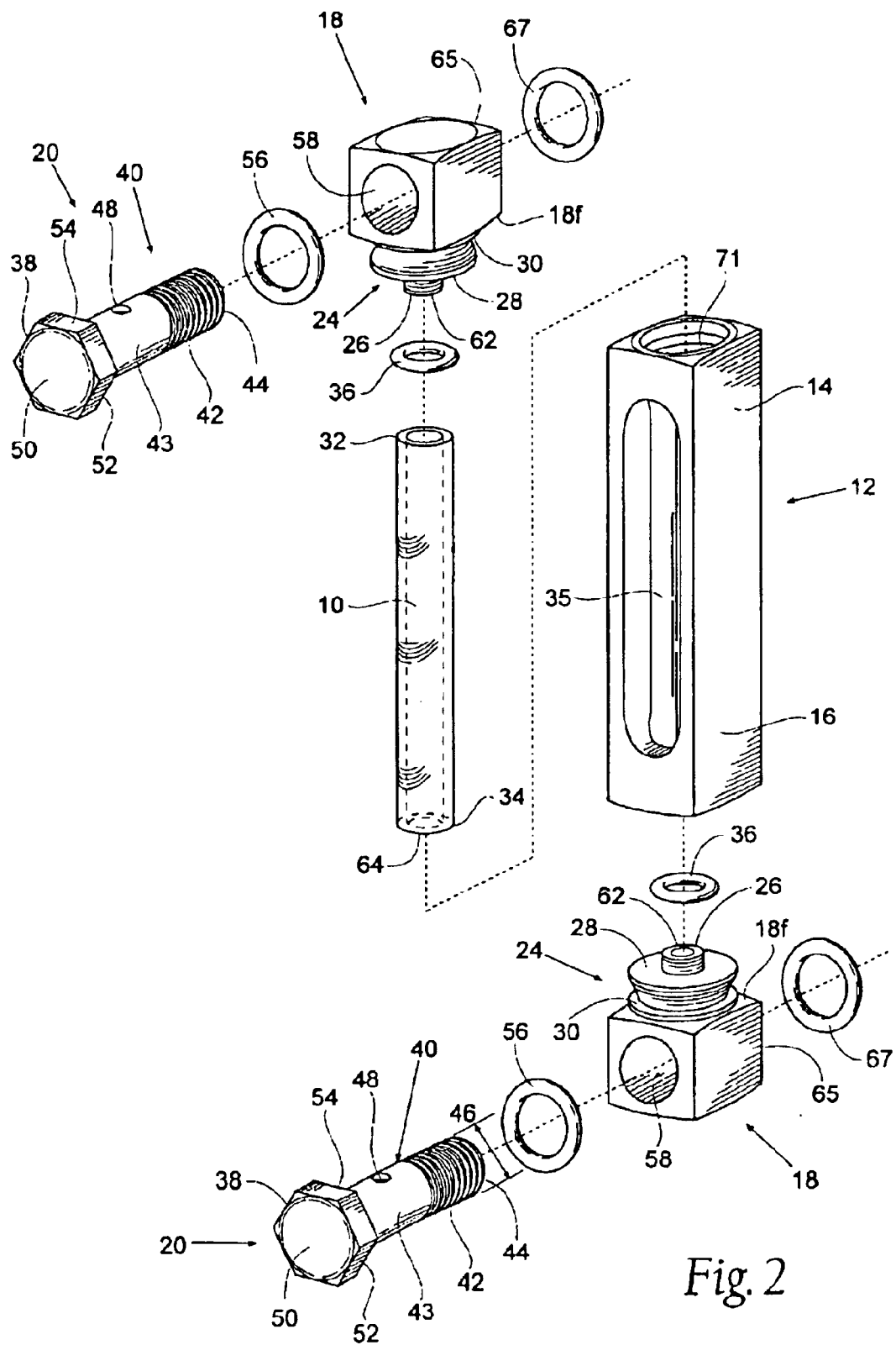
FIG. 2 is an exploded isometric view of the cooperating components of the present invention.
Figure 3:
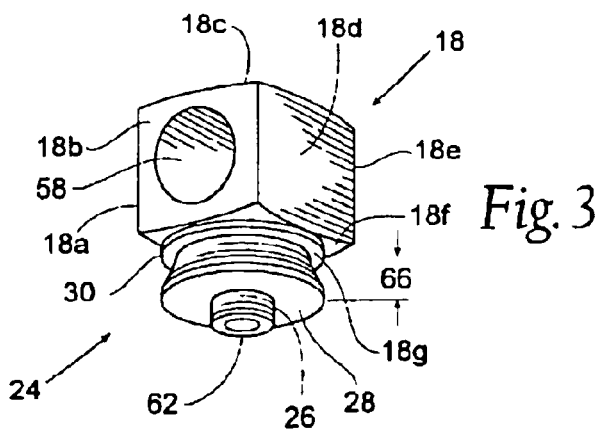
FIG. 3 is a detailed isometric view of an end member used in the present invention.
Figure 5:
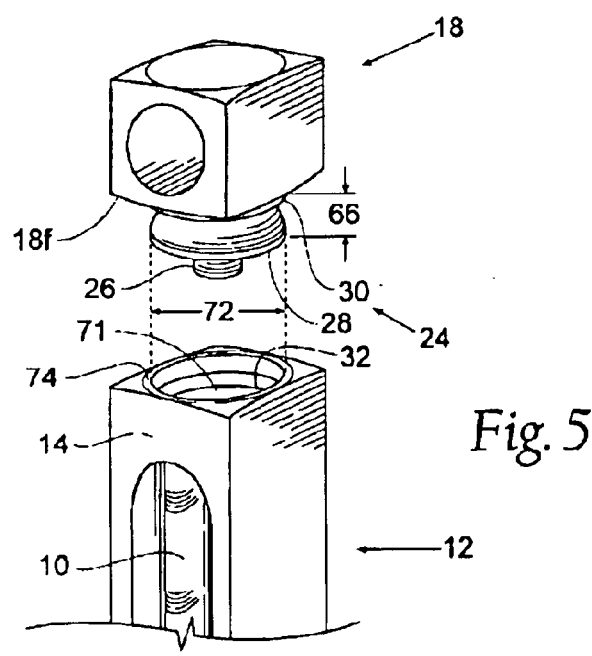
FIG. 5 is an exploded isometric fragmentary view of the end member illustrating its relationship with the shield member.

Referring next to FIGS. 2, 3, and 5, each end block 18 has an inwardly facing nipple 24 with an outwardly extending nipple extension 26 at the extremity of the nipple 24. The nipple extension 26 preferably has a smaller circumference than the nipple surface 28. The nipples 24 taper outwardly from the respective nipple bases 30 at the faces 18f of end blocks 18 to the respective nipple surfaces 28.

With particular reference to FIG. 2, the inspection sight member 10, with its respective ends 32 and 34, is placed inside of the shield member 12. The ends 32 and 34 are in contact with resilient o-ring end seals 36. Each end seal 36, in turn, is fittingly placed around a respective nipple extension 26 and sealingly engages the respective ends of the sight member 10 to minimize fluid leakage.

Referring to FIGS. 1 and 2, the sight member 10 is protected from the environment by the shield member 12. Ends 14 and 16 of the shield member 12 extend longitudinally beyond ends 32 and 34 of the sight member. Opening 35 in the shield member 12 allows sight member 10 to be visible while still being protected by shield member 12.

Again, with particular reference to FIG. 2, the shield member 12 has a bore 71 longitudinally centered throughout the shield member 12. The diameter of the bore 71 is slightly larger than the diameter of the sight tube member 10. The sight tube member 10 is telescopingly placed inside shield member 12.

Still with particular reference to FIGS. 2 and 9b, the respective mounting bolts 20 comprise a head 38, a hollow shank 40 (see FIG. 9b), an external thread 42 and a cylindrical bore 44 with an inner diameter 46. Interposed on the shank 40 at a right angle is an intersecting cross hole 48. The shank 40 terminates in a bolt head 38. The bolt head 38 has a bolt face 50 and an underside 52. The underside 52 of the bolt face 50 has an annular groove 54 (see FIG. 9b) arranged to receive a conventional o-ring 56. The diameter of each of the re-entrant bores 58 (see FIG. 9b) of the respective blocks 18 is larger than the inner unthreaded portion 43 of the bolts 20 to provide sufficient spacing for free flow of fluid through the hollow bore 44 of the bolt 20, the bolt holes 48, the aperture 62 of the nipple 24 and the conduit 64 of the sight tube 10. The respective sides of the end blocks 18 have an annular groove 65 to receive a resilient o-ring 67 (see FIG. 9b).

With further reference to FIGS. 2 and 9b, the sight member 10 is connected in fluid flowing relation to an object of interest, such as a tank (not shown). So connected, the compression exerted on the respective bolts 20 compresses the sealing gasket 56 (see FIG. 9b) against the face 18b of the block 18, thus facilitating a hermetic closure. Similarly, the seal 67 resting on the bolt 20 at the junction of the thread 42 and the shank 40, is compressed at the annular groove 65 creating a hermetic closure of the seal 67, the annular groove 65 and the bore 58 of the block 18. Seal 67 also seals against the tank surface (not shown) to prevent leakage around the thread 42 when the fluid level verification apparatus is mounted to the tank.

Fluid dispensed from and returning to the object of interest, such as a tank (not shown but including an entrance threaded opening matching the threads 42 of the bolts 20), flows through the bolt 20 by means of the re-entrant bore 44, and the block 18 by means of the bore 58 in the block 18, and cooperating with the cross hole 48. Fluid enters the aperture 62 of the nipple 24, and fills the conduit 64 of the inspection sight tube member 10 to the liquid level of the tank supporting the sight member 10.

Referring specifically to FIG. 3, each block 18, preferably includes a plurality of faces, 18a, 18b, 18c, 18d, 18e, and 18f. A cylindrical nipple extension 26 of said nipple 24 protrudes at a generally perpendicular offset from the face 18f of the respective end blocks 18. The nipple 24 has an aperture 62, which extends through the nipple 24 and the nipple extension 26 to intersect a bore 58 of the block 18, and is oriented generally parallel with the axis of the nipple 24.

Still referring particularly to FIG. 3, the nipple 24 is of a predetermined nipple height 66. The nipple 24 has a nipple base 30. The circumference of the nipple 24 tapers outward from the nipple base 30 to the nipple surface 28, with a minimum circumference at the nipple base 30, to a maximum circumference at the nipple surface 28. The circumference of the nipple extension 26 is smaller than that of the nipple base 30 or the nipple surface 28. The aperture 62 concentrically runs through the nipple 24 and the nipple extension 26, allowing for a free flow of fluid in communication with the bore 58 of the end block 18.

Figure 4:
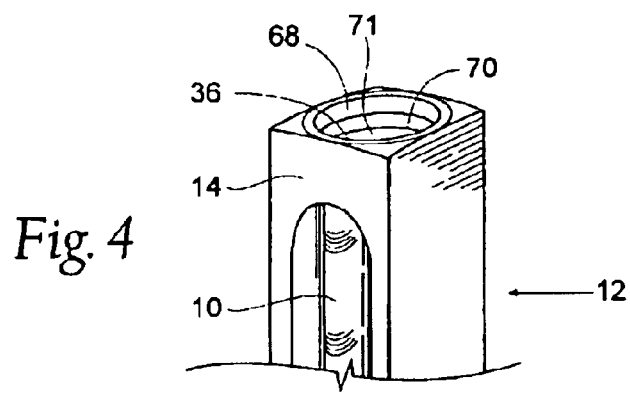
FIG. 4 is an isometric fragmentary view detailing the end of the sight tube shield member used in the present invention.

With particular reference to FIG. 4, a fragmented view of the sight tube 10 and the shield member 12 is shown in connection with the shield member end 14. On the inside of the shield member 12 at said end 14 are concentric grooves 68 and 70. Concentric groove 68 has a slightly larger diameter than the inner diameter of the bore 71 running through the shield member 12. The larger diameter of groove 68 results in a thinner section of the shield member 12 at that point, thereby easing the eventual indentation 22 (see FIG. 8) of the shield member end 14, and will hereinafter be described.

In FIG. 5, the end block 18 is shown enroute to placement inside the shield member 12. Nipple 24 has a diameter 72 essentially the same as the diameter of the bore 71 at the end 14 of the shield member 12, with just enough difference to allow the nipple 24 to fittingly slide through the shield member bore 71. Face 18f of the end block 18 will abut the top face 74 of the shield member 12. The nipple extension 26 will nestle into the inner diameter of end seal 36. The end seal 36 (not shown in FIG. 5) is seated between the sight tube 10 and the nipple 24. The faces 18f and 74 meet in such a way that the nipple height 66 longitudinally extends into the tube shield bore 71 so that the end of the nipple extension 26 may be at the same latitude as that of the end 32 of the sight tube 10. However, it should be noted that the diameter of nipple extension 26 is small enough not to interfere with the inner diameter of sight member 10.

Figure 6:
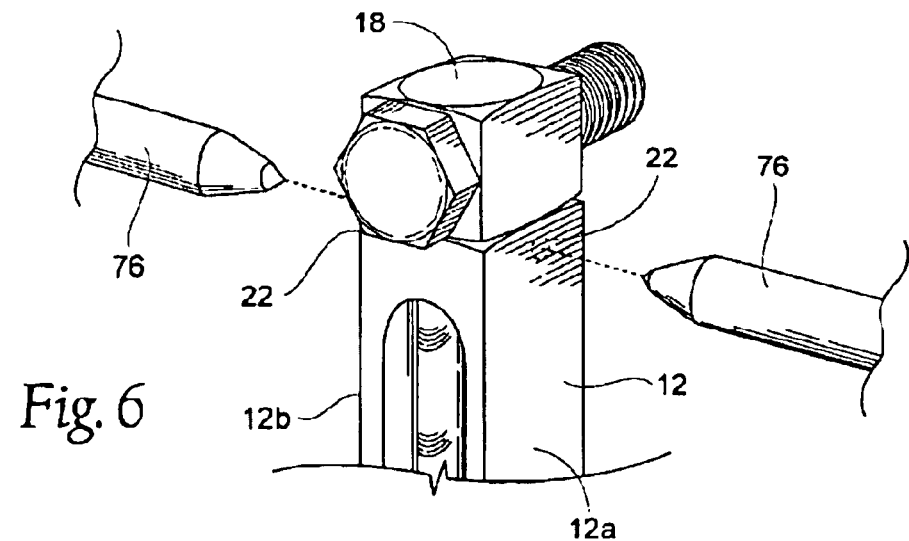
FIG. 6 is an isometric fragmentary view of the means used in securing the end members to the shield member.
Figure 8:
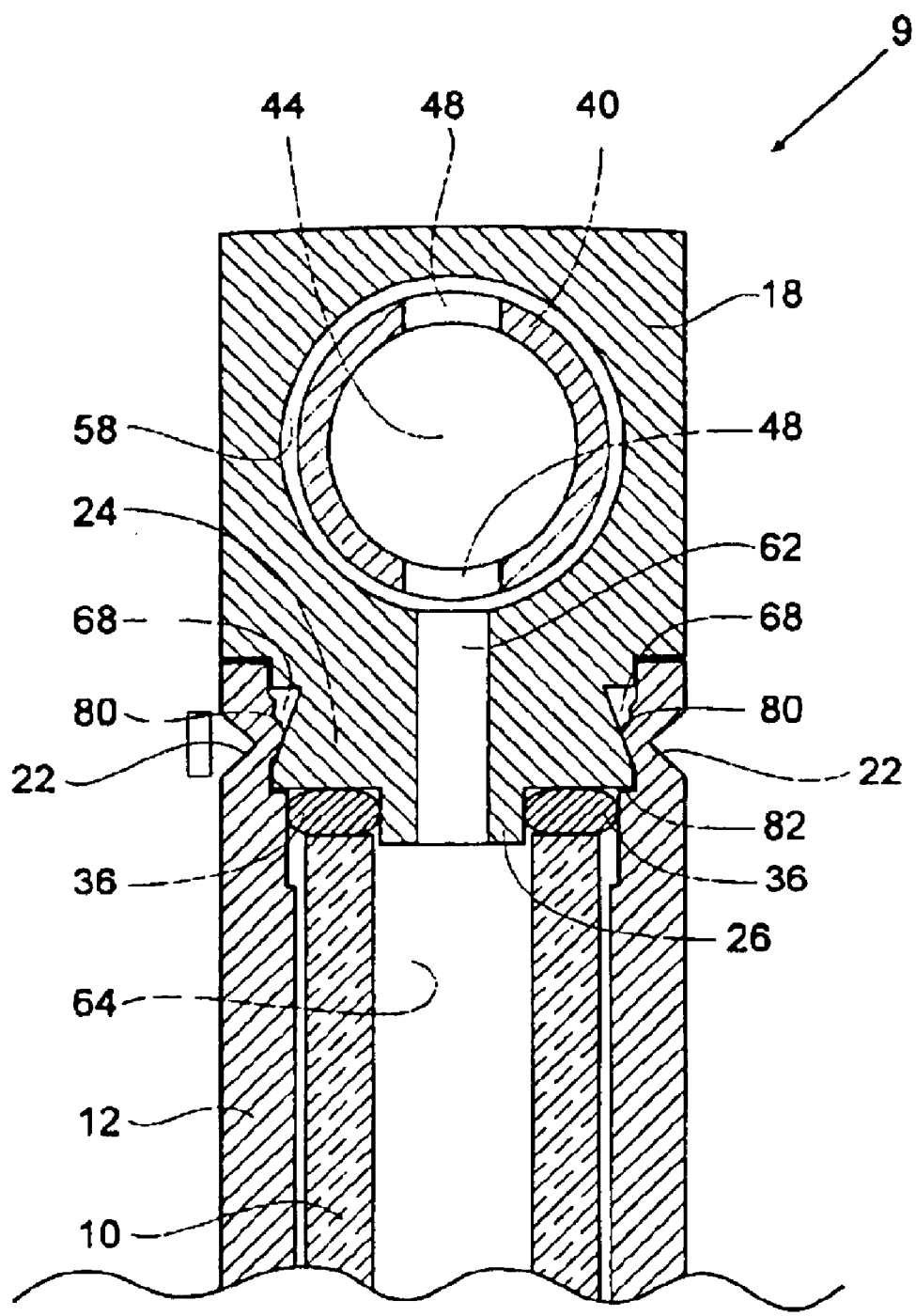
FIG. 8 is a longitudinal sectional fragmentary view of the present invention taken along lines 8—8 of FIG. 1, and showing in detail, an end member secured to the shield member.

Referring particularly to FIGS. 6 and 8, a means for permanently securing the block end 18 to the end 14 of the shield member 12 is shown. Conventional tool steel punches 76 are used to indent or stake opposing sides 12a and 12b of the shield member 12. The punches 76 will preferably come in at the latitude where groove 68 (see FIG. 8) is located on the shield member 12. The punches 76 form the indentations 22 in each of the respective sides 12a and 12b of the shield member 12, which cause detents 80 at the approximate latitude said groove 68 is located (see FIG. 8). It is within the purview of the present invention to incorporate one, two, three or more punches 76 simultaneously or at various intervals during the staking operation.

Figure 7A:
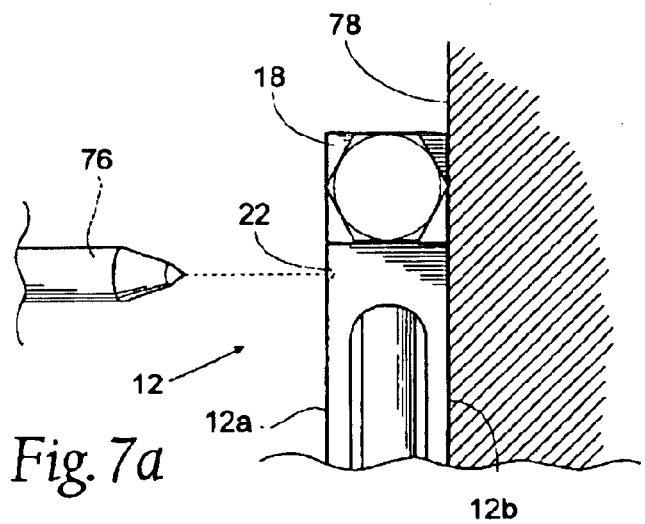
FIG. 7a is a fragmentary elevated view of an alternative means used in securing the end members to the shield member.

FIG. 7a shows means for an alternative method of permanently connecting the end block 18 to the shield member 12. The block end 18 and the shield member 12 are placed squarely together so that the side 12b is flush against a flat surface 78. The punch 76 forms the indentation 22 on the side 12a of the shield member 12 which is opposed to the side 12b touching the flat surface 78. The indention 22 Is at the latitude in the shield member 12 where said groove 68 is located, forming the detent 80 at the approximate latitude said groove 68 is located (see FIG. 8).

Figure 7B:
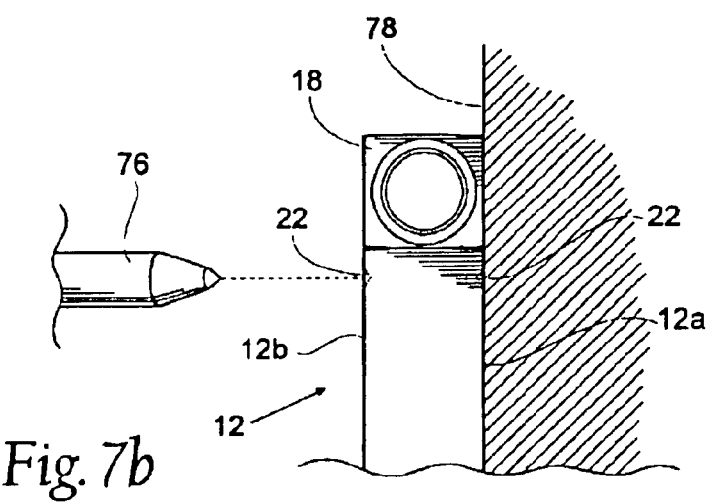
FIG. 7b is a fragmentary elevated view of the second step for the alternative means of FIG. 7a to connect the end members to the shield member.

FIG. 7b shows the means for continuing the process in FIG. 7a. The end block 18 and the shield member 12 are rotated 180 degrees. Side 12a is now flush against the flat surface 78. The punch 76 comes In contact with side 12b to form an indention 22 at the latitude in the shield member 12 where groove 68 is located, forming the detent 80 at the approximate latitude said groove 68 is located (see FIG. 8).

FIG. 8 shows a fragmentary cross-sectional view of the fluid level detection apparatus 9 after the end block 18 and the shield member 12 have been connected and secured. The cross-sectional view of the apparatus shows the sight tube member 10 fittingly connected with the end seal, or o-ring 36. The end seal 36 is shown seated between the sight tube member 10 and surrounding the nipple extension 26. An unblocked passageway is shown between the hollow bore 58 of the end block 18, the cross hole 48 of the bolt shank 40, the aperture 62 through the center of the nipple 24, and the conduit 64 passing through the sight member 10. The indention 22 forms a detent 80 at the concentric groove 68, which securely engages the nipple 24 to hold the end block 18 in place.

Next, with particular attention to the views of FIGS. 9a and 9b, it will be observed that the verification apparatus of this invention may also be used in connection with thermometers or other devices requiring protection from the elements. Again, like parts are indicated utilizing like reference characters.

The hollow shield member 12 houses a protective tubular sight or sight member 10. The bore or inner diameter 11 of the sight member 10, in turn, may house an elongated thermometer 13 held in place by means of longitudinally spaced o-rings 15. The o-rings 15 are preferably expandable to hold the thermometer 13 in compression against the inner diameter 11 of the tubular sight 10. The thermometer 13 may be of known construction and comprise an elongated transparent tube housing a heat expandable substance, such as dyed mineral spirits, mercury and/or other equivalent materials 17. The tubular thermometer 13 is conventionally positioned adjacent a backing temperature indicating plate 19, including numbered indicia arranged to indicate the temperature of fluid, such as heated water or oil, passing through the conduit 64 of the sight member 10.

As will be noted from the views of FIGS. 9*a* and 9*b*, the various cooperating components of the present apparatus embodiment act in similar fashion as the components illustrated and described in connection with the views of FIGS. 1–8, inclusive. The bolts 20 are arranged to be seated In the bores 58 of the respective end blocks 18, and respectively include re-entrant bores 44, which intersect aperture 62 of the end blocks 18. The bolts 20 are appropriately sealed to the end block 18 by means of o-rings 56 seated there between.

Figure 10A:
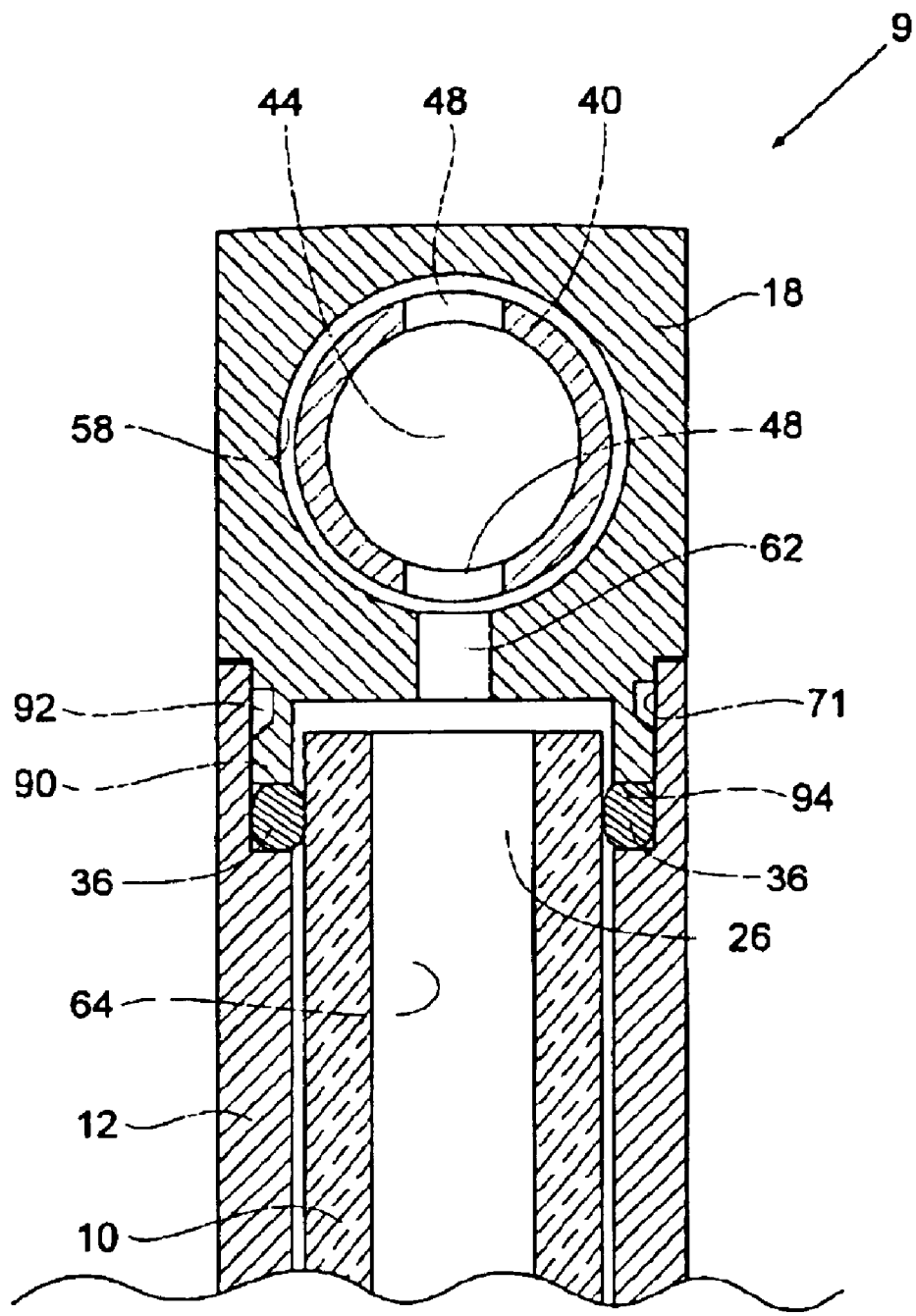
FIG. 10a is a longitudinal sectional fragmentary view of an alternate embodiment of the present Invention similar to the view of FIG. 8, and showing in detail, an end member prior to being permanently secured to the shield member.
Figure 10B:
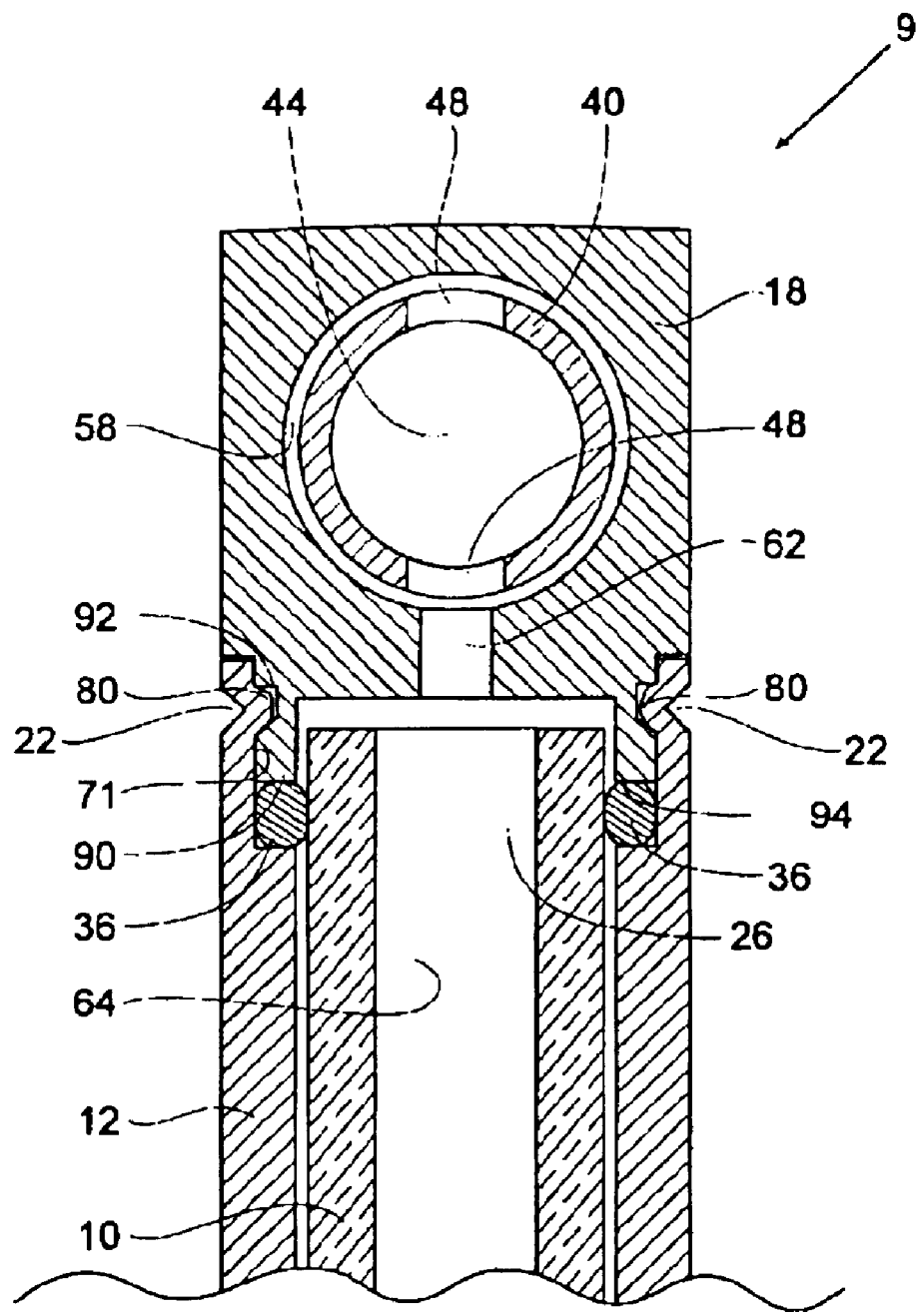
FIG. 10b is a longitudinal sectional fragmentary view of an alternate embodiment of the present invention similar to the view of FIG. 8, and showing in detail, an end member secured to the shield member.

An alternative construction of the seal between each site member 10, shield member 12 and end block 18 is shown in FIGS. 10*a* and 10*b*. The configuration of the nipple 24 extending from side 18*f* of end block 18 has been replaced with an annular skirt 90 having a groove 92 formed therein. The counter bore 71 formed in the shield member 12 has been extended inwardly. In contrast to the above-described embodiment, the o-ring 36 is now placed around the smooth outer perimeter of site member 10. When the outermost surface 94 of the annular skirt 90 of end block 18 is placed into the counter bore 71 of the shield member 12, the o-ring 36 is slightly compressed forming a hermetic seal between the site member 10, shield member 12 and end block 18. In contrast to the above-described embodiment, this arrangement prevents the necessity of putting the site member 10 under any axial compression. It is also desirable to have a press fit between the counter bore 71 of shield member 12 and annular skirt 90 of end block 18. The press fit aids during assembly in that it is not necessary to retain the shield member 12 and end block 18 under compression during the staking process. As shown in FIG. 10*b*, once the site member 10, shield member 12 and end block 18 are assembled, a greater variation is allowed for the exact location of the stake on each side of the shield member 12 without compromising the critical seal.

The sight tube 10 may be manufactured from glass. However, various substrates such as nylon, polycarbonate, or other synthetic materials may be used. While shown to be cylindrical in shape, it is conceivable that other conduit cross-sectional configurations could be utilized.

The shield member 12 and the end blocks 18 may be manufactured from aluminum, or other metals with similar malleable qualities of aluminum.

The above-described embodiments of this invention are merely descriptive of its principles and are not to be limited. The scope of this invention instead shall be determined from the scope of the following claims, including their equivalents.

What is claimed is:

1. A fluid level verification apparatus for a fluid container, the apparatus comprising:

a transparent tubular sight member defining a conduit and having oppositely disposed ends;

a shield member having a cylindrical bore adapted to receive the tubular sight member;

a pair of longitudinally spaced apart end members each having hollow interiors, the respective end members each having a cylindrical projection extending therefrom in facing and axially aligned relationship with said sight member;

each of said projections having an axial through bore communicating with the hollow interior of a corresponding end member and further including a circumferential surface exteriorly thereof;

said circumferential surface including at least one circumferential groove located at a preselected location intermediate the ends of said of a respective one of each of said projections;

said exterior surfaces of said cylindrical projections each additionally tapered outwardly from a respective end member and in a direction toward said sight member, said circumferential groove in said exterior surface being in a mating relationship with said detent in said shield member;

said shield member including an indentation extending inwardly of the interior surface of said through bore and in secured relationship with a respective one of said end members and onto said shield member, said indentation forming a detent in said shield member at said bore.

2. The fluid level verification apparatus of claim 1 further including a sealing means positioned between said shield member and each said respective end member.

3. The fluid level verification apparatus of claim 1 further including a fastening means connecting at least one of said end members to said fluid container for mounting the apparatus.

4. The fluid level verification apparatus of claim 3, wherein said hollow fastening means comprises a headed bolt extending in fore and aft direction through the hollow end member.

5. The fluid level verification apparatus of claim 4 wherein said sealing means surrounds the bolt at the front and rear of the end member to seal the member against the bolt head and tank respectively.

6. The fluid level verification apparatus of claim 1 wherein a thermometer is located within the conduit of said tubular sight member.

7. The fluid level verification apparatus of claim 1 wherein said tubular sight member comprises an inner diameter, each of said end member cylindrical projections being coaxially and radially spaced with relation to said inner diameter of said tubular sight member.

* * * * *